J. W. KIRK.
Seed-Dropper.
No 20,946
Patented July 20, 1858
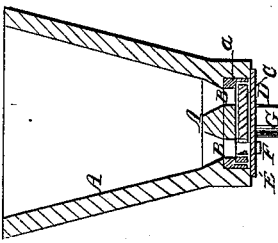
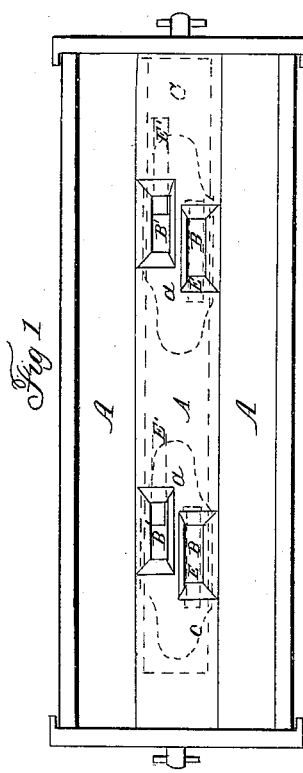
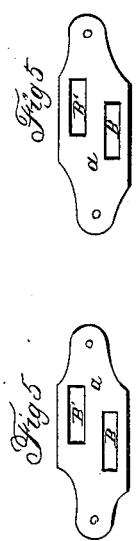
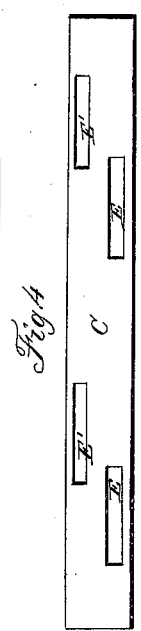
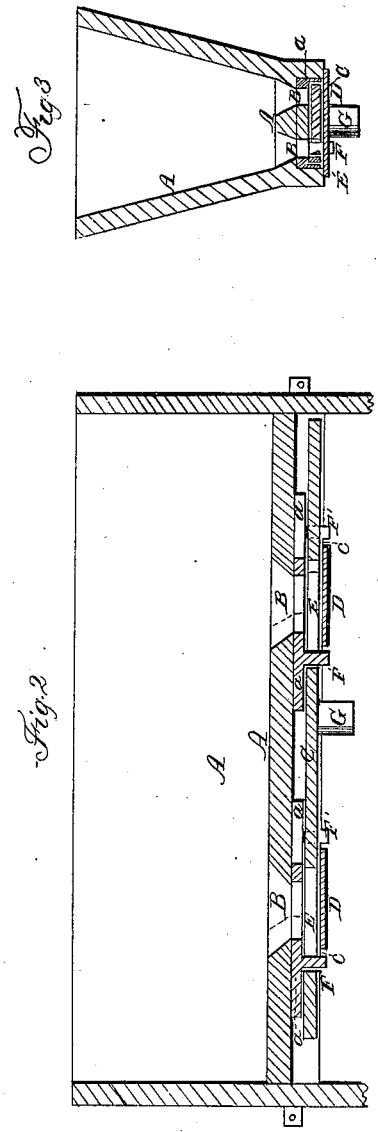

UNITED STATES PATENT OFFICE.

JACOB W. KIRK, OF RISING SUN, MARYLAND.

IMPROVEMENT IN SEED-DRILLS.

Specification forming part of Letters Patent No. 20,946, dated July 20, 1858.

*To all whom it may concern:*

Be it known that I, J. W. KIRK, of Rising Sun, in the county of Cecil and State of Maryland, have invented a new and useful Improvement in Seed-Drills; and I do hereby declare that the following is a full, clear, and exact description of the same, reference being had to the accompanying drawings, forming a part of this specification, in which—

Figure 1 is a plan or top view of a seed-drill hopper with my improvements applied to it. Fig. 2 is a vertical longitudinal section of the same. Fig. 3 is a vertical transverse section of the same. Fig. 4 is a detached view of the distributing-slide. Figs. 5, 5 are detached views of stop-plates for controlling the movements of the slide.

Similar letters of reference in each of the several figures indicate corresponding parts.

I am aware that in D. O. Daniel's, Jacob Kern's, and Friederick Moehlmann's seed-drills two passages are shown in the bottom of the hopper and in the slide; but the passages in the hopper are never used together for sowing one kind of grain, they being divided by a partition, and designed one for sowing wheat and the other oats; and in order to accomplish this the wheat-passage is made of a greater depth than the oat-passage, and thus it will be evident that the two passages will not answer for planting at the same time one kind of grain, the oat-passage being too shallow for wheat and the wheat-passage too deep for oats, or so deep that a too free discharge will take place.

My invention is not adapted for sowing two kinds of grain, but is intended for discharging but one kind of grain through two passages at the same time at every point of discharge in the bottom of the hopper.

The nature of my invention consists in a seed-hopper which has at each point of discharge two passages arranged alongside and one a little in advance of the other, and both used at the same time, in combination with a seed-slide which has two passages similarly arranged and of equal depth with each other, ordinary stop-pins and a guard-plate being used in connection with the above, as presently described. By this particular arrangement of duplicate discharge-passages in the bottom of the hopper and in the slide the grain is pushed in different directions. Hence it does not interfere the one stream with the other, and it is not so liable to choke; that after the grain is discharged by the slide the distance is greater before it is deposited. Hence it is more intimately mixed, the stream is more steady and constant, and not liable to jets from the sudden discharge of the slide, and hence does not bunch the wheat or grain in rows near so much as Hunt's, Moore's, Pennock's, Wood's, and Haines's drills. By employing a slide with two passages at each point of discharge and using only one passage at a time—as in Kern's, Daniel's, and Moehlmann's drills—the advantage of the duplicate passages is lost, and the choking is just as likely to happen as with the slide which has but one passage at said point, and the bunching also will be experienced, and, in fact, no advantage is gained over the common slide, except so far as the capability of planting either oats or wheat by the same hopper and slide is concerned.

To enable others skilled in the art to make and use my invention, I will proceed to describe its construction and operation.

A represents the seed-hopper; B B', two passages in the bottom of the same at each point of discharge. These passages are arranged alongside each other, one a little in advance of the other, as shown.

C (shown in red in Fig. 1 and in black in the other figures) is the seed-slide, arranged between guide-plates *a a* of the bottom of the hopper and guard-plates D D. This slide has two passages, E E', cut through it at each point of discharge. Said passages are of greater length than the passages in the hopper, and are arranged alongside each other, one a little in advance of the other. The passages of the slide are located in such relation to the passages of the hopper that while E is receiving grain from the hopper E' is discharging, and vice versa. Thus the discharge is effected at the back as well as at the forward movement of the slide. The guard-plates D D serve as bottoms to the cells or passages of the slide while said cells are receiving grain from the hopper and until the proper time for discharge arrives. The discharge of the grain from the passages alternately takes place at opposite ends, *c c'*, of the guard-plates as the slide moves back and forth. The extent of the movement of the slide is controlled by means of the stop-pins F F', which project down from the guide-plates of the bottom of the hopper through the passages of the slide, said passages being made long enough to allow for their accommodation without having the discharge of the seed interfered with. The slide is moved from its center G, and the extent of its movement can be regulated in the ordinary manner, and thus the quantity of seed sown to an acre controlled.

What I claim as my invention, and desire to secure by Letters Patent, is—

A seed-hopper which has at each point of discharge two passages arranged alongside and one a little in advance of the other, and both used at the same time, in combination with a seed-slide which has two passages similarly arranged and of equal depth with each other, substantially as and for the purposes set forth.

JACOB W. KIRK.

Witnesses:
  THOS. D. CLAYTON,
  JOB HAINES.